(12) United States Patent
Schröter

(10) Patent No.: US 8,417,953 B2
(45) Date of Patent: Apr. 9, 2013

(54) METHOD AND SYSTEM FOR RESTRICTED SERVICE ACCESS

(75) Inventor: Andreas Schröter, Dusseldorf (DE)

(73) Assignee: Koninklijke KPN N.V., The Hague (NL)

( * ) Notice: Subject to any disclaimer, the term of this patent is extended or adjusted under 35 U.S.C. 154(b) by 0 days.

(21) Appl. No.: 11/720,977

(22) PCT Filed: Dec. 8, 2005

(86) PCT No.: PCT/EP2005/013212
§ 371 (c)(1),
(2), (4) Date: Sep. 3, 2009

(87) PCT Pub. No.: WO2006/069622
PCT Pub. Date: Jul. 6, 2006

(65) Prior Publication Data
US 2009/0313479 A1    Dec. 17, 2009

Related U.S. Application Data

(60) Provisional application No. 60/640,877, filed on Dec. 30, 2004.

(51) Int. Cl.
*G06F 21/00* (2006.01)
(52) U.S. Cl.
USPC .............. 713/172; 713/174; 713/185; 726/20
(58) Field of Classification Search .................. 713/172, 713/174, 185; 726/20
See application file for complete search history.

(56) References Cited

U.S. PATENT DOCUMENTS

| | | | | |
|---|---|---|---|---|
| 5,191,611 A | * | 3/1993 | Lang | ............... 705/53 |
| 6,163,272 A | | 12/2000 | Goode et al. | |
| 6,199,114 B1 | | 3/2001 | White et al. | |
| 6,616,535 B1 | * | 9/2003 | Nishizaki et al. | ............... 463/43 |

FOREIGN PATENT DOCUMENTS

| | | |
|---|---|---|
| EP | 0936583 A1 | 8/1999 |
| EP | 1246434 A1 | 10/2002 |
| FR | 2760159 A1 | 8/1998 |
| WO | WO2004/036513 | 4/2004 |
| WO | WO 2004036467 A1 * | 4/2004 |

OTHER PUBLICATIONS

Vedder, K., "Security Aspects of Mobile Communications," Computer Security and Industrial Cryptography, May 21-23, 1991, pp. 193-210.

* cited by examiner

*Primary Examiner* — Justin T Darrow
(74) *Attorney, Agent, or Firm* — McDonnell Boehnen Hulbert & Berghoff LLP

(57) ABSTRACT

A method and system for restricted service access is described. To access adult content, the user has to enter an administrator personal identification number into a mobile device. Upon receipt of the administrator personal identification number, an access code is generated, which is provided to a content provider. The content provider can calculate a valid time window and/or request an acknowledge message from a central server. If the current usage is within the valid time window or otherwise verified, access to the content is allowed. Thus, children are prevented from accessing adult content, while adult access is permitted.

15 Claims, 2 Drawing Sheets

METHOD AND SYSTEM FOR RESTRICTED SERVICE ACCESS

FIELD

The present invention relates generally to wireless communications, and more particularly, relates to a method and system to restricting access to adult content using a wireless communication device.

BACKGROUND

It is common for people, especially family members, to share wireless communication devices, such as mobile phones. For example, a parent may purchase a mobile phone and lend it to a child during the day so that the child can call the parent when the child needs to be picked up from school. After being picked up, the child may return the mobile phone to their parent, who may use the mobile phone during the evening.

Over time, capabilities have been added to mobile phones allowing mobile subscribers to have access to more and more services. Mobile phones are not just for phone calls anymore. A mobile subscriber can now check their e-mail, send photos, and make on-line purchases using their mobile phone. The amount of content that can be accessed by the subscriber seems almost limitless. However, not all content is appropriate for children.

Providing adult content is a big business. However, this type of content should not be accessed by children. In fact, it may be illegal to allow children to access adult content. When both adults and children are using the same mobile phone, there needs to be some mechanism that prevents children from accessing the adult content, while still allowing adult access.

The already existing security mechanisms (terminal+SIM card+PIN) used by mobile operators are not sufficient. The maintenance and personal delivery of additional PINs is also a problem (at least from a commercial point of view). Other already existing PINs (e.g., i-mode PIN) can be switched off to simplify usage for other content types. Thus, additional barriers need to be implemented.

SUMMARY

A method and system for restricted service access is described. The invention ensures a closed user group for content offers and services. A Smart Card (e.g., a microcontroller data card with protected data ranges (see ISO/IEC 7816)) with two protection levels is used. The first protection level controls the normal usage, while the second protection level is intended for the administration of specific personal data. Only with the knowledge of the personal identification number (PIN) of the second protection level is access to a microcontroller based calculation method (algorithm) given, with which a key can be calculated an displayed, which can be validated at another location with the same or an inverse algorithm.

The Smart Card is used in a terminal and the user interface is handled by the terminal. The Smart Card (SIM card) in a telecommunication terminal is also used for identification of the contract partner within a telecommunication network.

The protection levels are linked to the access codes PIN1 and PIN2 of a SIM (subscriber identification module) card.

The calculation of the key is ciphered but time based and the validation is done also time based. Alternatively and/or additionally, the calculation of the key is ciphered but personalized and is based on a protected (unchangeable and/or unreadable) or open individual data on the Smart Card and the validation at another location is based on the same individual data.

The individualization can be switched on and off by the user. The individualization can be switched on and off by a message sent to the Smart Card, which, for example, can be sent to the telecommunication device and is forwarded to the Smart Card.

The algorithm for the key calculation can be parameterized by a message sent to the Smart Card, which, for example, can be sent to the telecommunication device and is forwarded to the Smart Card.

A message (e.g., SMS) is sent when the key is generated. It is possible to charge for that message.

The validation is prerequisite for the access to content offers or services in different media (internet, WAP, i-mode™, MMS, . . . ). The validation is independent from the communication network and data. The validation is done within parts of the telecommunication network and is offered to third parties as a service.

Random numbers may be generated for screening instead of a valid key, if the personal identification number of the second protection level is not used.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

A method 100 and system 200 for restricted service access is described. The solution is based on the idea of limiting access to adult related content via a personalized and/or time based access code. The solution prevents children from accessing adult content while using a mobile device 202, while still allowing adult access. The solution is media independent (e.g., i-mode, WAP, internet, MMS).

Figure 1:
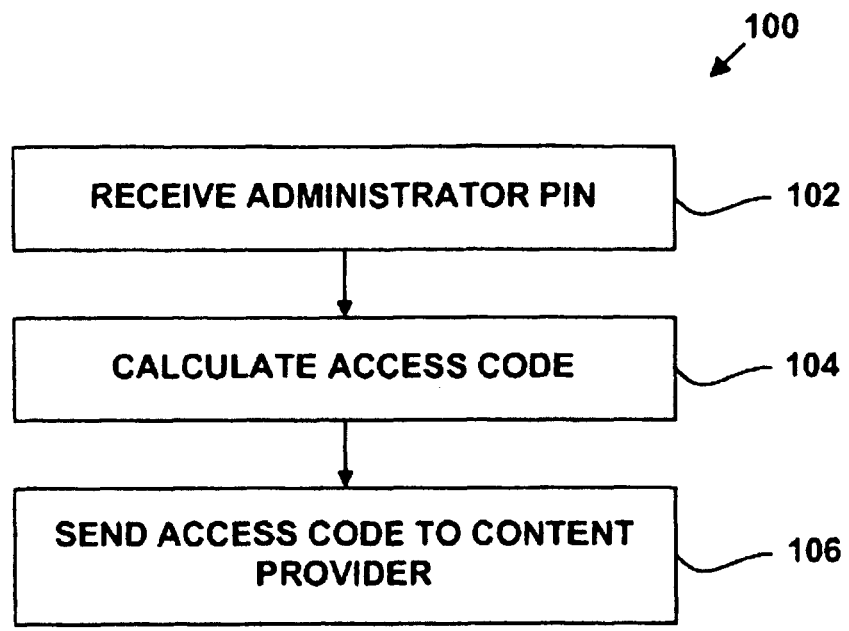
FIG. 1 is a flow diagram depicting a method for restricted service access, according to an embodiment.

FIG. 1 is a flow diagram depicting the method 100 for restricted service access. The method 100 includes receiving an administrator PIN 102, calculating an access code 104, and sending the access code to a content provider 106. Upon receipt of the access code, the content provider can verify that the user entering the administrator PIN is authorized to receive the content. The method 100 is further described with reference to the system 200.

Figure 2:
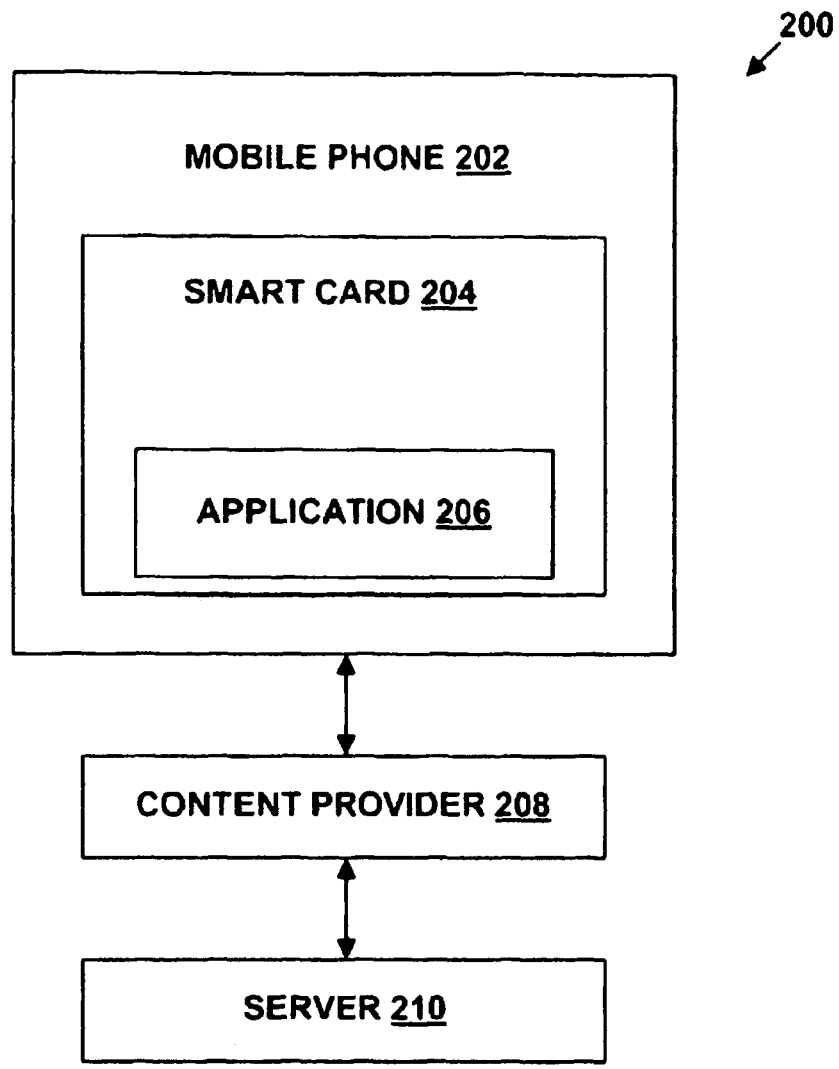
FIG. 2 is a block diagram depicting a system for restricted service access, according to an embodiment.

FIG. 2 is a block diagram depicting the system 200 for restricted service access. The access code is derived from an application 206 running on a smart card 204 (e.g., a subscriber identification module (SIM) card), which is protected via an additional personal identification number (PIN) code. A valid access code is calculated if a user has entered the administrator PIN (PIN 2) of the SIM card 204 and the mobile phone 202 is already activated and/or PIN 1 is known as well.

SIM cards usually do have two PIN numbers linked to different security areas. The first PIN normally protects the mobile phone/SIM being used without permission for normal calls and so on. The second (administrator) PIN covers settings like restricted numbers, switch on/off PIN1, and so on. The second PIN may be secret even if the phone is used by different people.

To use the content offer, the user has to enter PIN2 before a calculated access code is generated (e.g., in a browser), which is provided to a content provider 208. The access code is built in such a way that the content provider 208 is able to calculate a valid time window or can request an acknowledge message from a central server 210. If the current usage is within the valid time window, access is allowed.

The access code may be personalized and/or time based. For a personalized access code, a unique number (e.g., an Integrated Circuit Card identification (ICCID)) stored on the SIM card 204 at production is added to the algorithm to calculate the access code. This unique number is known to the central server 210 as well (e.g., by translating the Mobile Station International ISDN Number (MSISDN) into the ICCID). The server 210 can validate the request from the content provider 208. This is possible if the SIM card 204 is also used to establish the connection to the mobile network. That means that the personalized access code can only be used in combination with the generating. SIM card 204. Alternatively and/or additionally, an individual start value (perhaps random) may be used to calculate the access code, which is known only by the content provider 208 and the user.

With the personalized access code, it is more complicated to decipher or "crack" the algorithm. When it is ensured (e.g., via passport control) that the SIM card 204 and the PINs are handed over to the right adult person, it is only possible for these people to get access to the closed user group and the content offer, even if the mobile phone 202 itself is used by other persons (e.g., within the family).

The method 100 may be used for different media types (i-mode, WAP.MMS, . . . ) and can even be used for non-mobile offers via internet and PCs (in time based only mode). With additional means (over the air provisioning) it can be ensured that the algorithms can be modified to enhance the security and/or to switch between personalized and time based modes.

By sending an SMS when the access code is generated, it may be possible to charge a fee to the access code.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

The invention claimed is:

1. A system to ensure a closed user group for content offers and services, the system comprising:
a Smart Card having a first protection level and a second protection level, wherein the first protection level controls normal usage and the second protection level controls administration of individual data, wherein a personal identification number (PIN) of the second protection level is used to access a microcontroller based calculation algorithm, and wherein the algorithm calculates and displays a key, which can be validated at another location with the same or an inverse algorithm,
wherein the first and second protection levels are linked to personal identification numbers PIN1 and PIN2 of a subscriber identification module (SIM) card respectively, and
wherein the calculation of the key is ciphered, personalized, and based on protected individual data on the Smart Card and the validation at another location is based on the same individual data.

2. The system of claim 1, wherein the Smart Card is used in a terminal and a user interface is handled by the terminal.

3. The system of claim 2, wherein the Smart Card in the terminal is also used for identification of a contract partner within a telecommunication network.

4. The system of claim 1, wherein the calculation of the key is ciphered and time based, and wherein the validation is also time based.

5. The system of claim 1, wherein the personalization can be switched on and off by a user of the Smart Card.

6. The system of claim 1, wherein the personalization can be switched on and off by sending a message to the Smart Card.

7. The system of claim 1, wherein the algorithm for the key calculation can be parameterized by a message sent to the Smart Card.

8. The system of claim 1, wherein a Short Message Service (SMS) message is sent when the key is generated, and wherein it is possible to charge that SMS message.

9. The system of claim 1, wherein the validation is a prerequisite for access to content.

10. The system of claim 1, wherein random numbers are generated for screening instead of a valid key, if the personal identification number of the second protection level is not used.

11. The system of claim 1, wherein the validation is media independent and independent of a particular communication network.

12. The system of claim 1, wherein the validation is done within parts of the telecommunication network and is offered to third parties as a service.

13. A system to ensure a closed user group for content offers and services, the system comprising:
a Smart Card having a first protection level and a second protection level, wherein the first protection level controls normal usage and the second protection level controls administration of individual data, wherein a personal identification number (PIN) of the second protection level is used to access a microcontroller based calculation algorithm, and wherein the algorithm calculates a key, which can be validated at another location with the same or an inverse algorithm,
wherein the first and second protection levels are linked to personal identification numbers PIN1 and PIN2 of a subscriber identification module (SIM) card respectively, and
wherein the calculation of the key is ciphered, personalized, and based on protected individual data on the Smart Card and the validation at another location is based on the same individual data.

14. The system of claim 2, wherein the terminal is a telecommunications terminal configured for use in a telecommunications network.

15. The system of claim 1, wherein the key is transmitted to a content provider, and wherein the key enables the content provider to calculate a valid time window for accessing restricted content.

* * * * *